United States Patent [19]

Nishihara

[11] Patent Number: 4,682,289

[45] Date of Patent: Jul. 21, 1987

[54] VIEW INTERPOLATION IN A TOMOGRAPHY SYSTEM USING PIPE LINE PROCESSING

[75] Inventor: Eitaro Nishihara, Tochigi, Japan

[73] Assignee: Tokyo Shibaura Denki Kabushiki Kaisha, Kawasaki, Japan

[21] Appl. No.: 821,211

[22] Filed: Jan. 23, 1986

Related U.S. Application Data

[63] Continuation of Ser. No. 455,999, Jan. 6, 1983, abandoned.

[30] Foreign Application Priority Data

Jan. 6, 1982 [JP] Japan ................................. 57-380

[51] Int. Cl.$^4$ .......................... G06F 15/42; A61B 6/03
[52] U.S. Cl. ..................................................... 364/414
[58] Field of Search ............... 364/414, 577, 723, 853; 358/111, 166; 378/901; 250/363 S; 382/52, 54

[56] References Cited

U.S. PATENT DOCUMENTS

| | | | |
|---|---|---|---|
| 3,983,398 | 9/1976 | Boyd | 378/901 X |
| 4,052,620 | 12/1977 | Brunnett | 378/901 X |
| 4,125,858 | 11/1978 | Hounsfield et al. | 382/54 |
| 4,135,247 | 1/1979 | Gordon et al. | 378/901 X |
| 4,136,388 | 1/1979 | Lindquist | 364/414 |
| 4,158,887 | 6/1979 | Kosugi | 364/723 |
| 4,189,775 | 2/1980 | Inouye et al. | 364/414 |
| 4,219,876 | 8/1980 | Mizutani et al. | 364/414 |
| 4,222,104 | 9/1980 | Moore | 382/54 |
| 4,275,444 | 6/1981 | Ryan | 382/54 |
| 4,280,178 | 7/1981 | Nassi et al. | 364/414 |
| 4,293,912 | 10/1981 | Walters | 364/414 X |
| 4,301,473 | 11/1981 | Wallace et al. | 358/166 |
| 4,313,163 | 1/1982 | Mizutani | 364/414 |
| 4,314,337 | 2/1982 | Kowalski | 364/414 |
| 4,386,528 | 6/1983 | Engle | 73/606 |
| 4,446,521 | 5/1984 | Inouye | 364/414 |

FOREIGN PATENT DOCUMENTS 2708604 8/1978 Fed. Rep. of Germany ...... 387/901

OTHER PUBLICATIONS

Brooks, R. A., et al., "A New Approach to Interpolation in Computed Tomography", *Journal of Computer Assisted Tomography*, vol. 2, No. 5, Nov. 1978, 577–585.
Lewitt, R. M., et al., "Image Reconstruction from Projections", *Optik*, vol. 50, No. 2, 1978, 85–109.
Nassi, M., et al., "A Method for Stop-Action Imaging of the Heart using Gated Computed Tomography", *IEEE Trans. on Biomed. Eng.*, vol. BME-28, No. 2, Feb. 1981, 116–122.
Weiss, G. H., et al., "The Use of Phantom Views to Reduce CT Streaks due to Insufficient Angular Sampling", *Phys. Med. Biol.*, vol. 27, No. 9, 1982, 1151–1162.
Joseph et al., "View Sampling Requirements in Fan Beam Computed Tomography", *Med. Phys. 7(6), Nov./Dec. 1980*, 692–702.

Primary Examiner—Jerry Smith
Assistant Examiner—Clark A. Jablon
Attorney, Agent, or Firm—Cushman, Darby & Cushman

[57] ABSTRACT

A computerized tomography apparatus comprises a source rotating about an object for directing fan-shaped beams of radiation towards the object, a detector for detecting the fan-shaped beams of radiation through the object and producing projection data representative of radiation intensity integrated along the beams at successive different views, and estimating circuitry for providing interpolated projection data between adjacent views in addition to projection data from the detector by using a pipeline process to increase the number of projection data.

13 Claims, 9 Drawing Figures

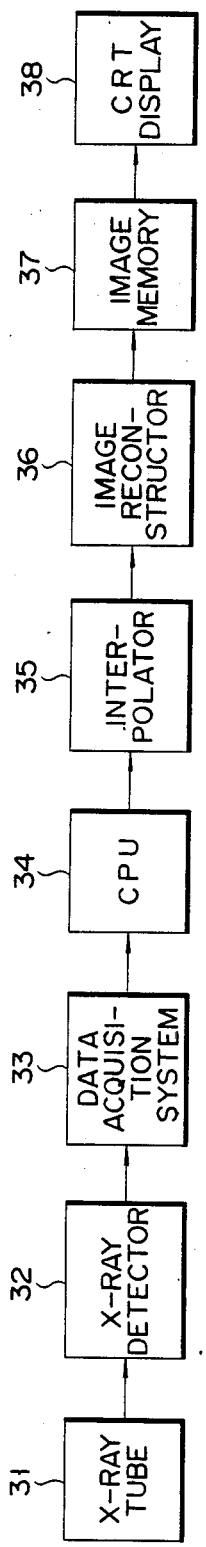

FIG. 9

| TRANSFER SEQUENCE | 0 | 1 | 2 | 3 | 4 | 5 | 6 | 7 | 8 | 9 | 10 |
|---|---|---|---|---|---|---|---|---|---|---|---|
| DATA TRANSFER | 0 | 0 | | 2 | | 3 | | 5 | 6 | 6 | 7 |
| INTERPOLATION PROCESSING | 0 $\frac{1}{4}$ | 0 $\frac{1}{2}$ | 1 $\frac{3}{4}$ | 2 $\frac{2}{4}$ | 3 $\frac{1}{4}$ | 3 $\frac{1}{2}$ | 4 $\frac{3}{4}$ | 5 $\frac{2}{4}$ | 6 $\frac{1}{4}$ | 6 $\frac{1}{2}$ | 7 $\frac{3}{4}$ |
| | 0 $\frac{1}{2}$ | 0 $\frac{1}{2}$ | 1 $\frac{2}{4}$ | 2 $\frac{3}{4}$ | 3 $\frac{1}{2}$ | 3 $\frac{1}{4}$ | 4 $\frac{2}{4}$ | 5 $\frac{3}{4}$ | 6 $\frac{1}{2}$ | 6 $\frac{1}{4}$ | 7 |
| INTERPOLATED DATA | — | 0 | 0.75 | 1.5 | 2.25 | 3 | 3.75 | 4.5 | 5.25 | 6 | 6.75 |

VIEW INTERPOLATION IN A TOMOGRAPHY SYSTEM USING PIPE LINE PROCESSING

This is a continuation of application Ser. No. 455,999 filed Jan. 6, 1983, which was abandoned upon the filing hereof.

BACKGROUND OF THE INVENTION

The present invention relates to a computerized tomography apparatus and a method for reconstructing a cross-sectional image of an object.

Conventionally, an X-ray computerized tomography (CT) apparatus and a method for reconstructing a cross-sectional image of the object are known wherein an X-ray tube is moved around an object to be photographed for projecting a fan-beam of X-rays at a plurality of positions, X-rays transmitted through the object are detected by an X-ray detector and detected X-rays in the form of projection data are processed to perform image reconstruction, thereby providing a tomogram of the object. Such an apparatus and method are disclosed in, for example, U.S. Pat. No. 4,135,247.

FIG. 1 is a block diagram showing an example of a conventional CT apparatus.

An X-ray tube 11 is moved around the object and projects a fan-beam of X-rays at a plurality of positions. An X-ray detector 12 detects X-ray transmitted through the object. Detected X-rays in the form of analog projection data are acquired by a data acquisition system 13 and are converted to digital data. The projection data converted in the digital form are supplied to the subsequent stages which constitute a pipeline processor. More specifically, the projection data acquired by the data acquisition system 13 are supplied to a central processing unit (CPU) 14. The CPU 14 transfers the projection data to a corrector 16 through a CPU/processor interface 15. The corrector 16 compensates projection data. Corrected projection data from the corrector 16 are stored in a corrector/convolver (C/C) memory 17. The projection data stored in the C/C memory 17 are read out and supplied to a convolver 18. The projection data are then convolved with a deblurring function. Convolved projection data are then supplied to an image reconstructor 19 in which image reconstruction is performed for each data to obtain a final picture. The reconstructed image data are accumulated in an image memory 20. The reconstructed image data accumulated in the image memory 20 is read out and displayed at a CRT display 21.

In the CT apparatus of the type described above, detection of X-ray data will be described with reference to FIG. 2. The X-ray tube 11 opposes the X-ray detector 12. The X-ray detector 12 comprises a plurality of detecting elements D linearly aligned with each other. Each detecting element D receives an X-ray in a channel (path) formed by connecting the X-ray tube 11 and this detecting element and provides an output signal representative of X-ray intensity integrated along the channel. The X-ray tube 11 and the X-ray detector 12 are rotated on a circle in the same direction at a proper timing in units of predetermined angles $\Delta\theta$. One image reconstruction operation corresponds to one revolution. Every time they are rotated at an angle of $\Delta\theta$, the X-ray tube 11 projects a fan-beam of an X-ray which is then detected by the X-ray detector 12.

In this case, the smaller the angle $\Delta\theta$ is, the more the projection data is obtained upon one revolution of the X-ray tube 11 and the X-ray detector 12. As a result, the quality of the reconstructed image is improved.

However, when the number of projection data is increased, the number of X-ray projections is increased, and image reconstruction processing time is increased.

However, when the angle $\Delta\theta$ is increased, the number of projection data upon one revolution of the X-ray tube 11 and the X-ray detector 12 is decreased. Therefore, image reconstruction time is shortened.

However, when the number of projection data is thus decreased (e.g., 300), noise is mixed in the reconstructed image in the form of streak.

SUMMARY OF THE INVENTION

The present invention has been made in consideration of the above situations, and has for its object to provide a computerized tomography apparatus and a method of reconstructing a cross-sectional image of an object, wherein only short processing time is required to obtain a highly precise reconstructed image.

According to the invention, there is provided a computerized tomography apparatus for reconstructing a cross-sectional image of an object comprising:

source means for directing a fan-beam of radiation passing through the object;

detector means having a plurality of elements for detecting the radiation through the object along a plurality of paths and for providing corresponding output signals representative of radiation intensity integrated along each of said paths;

scanning means for effecting relative rotation of said source means and said detector means and for obtaining projection data from said output signals at different viewpoints with respect to said object;

transfer means for transferring said projection data as a train of said projection data according to said relative rotation of said source means and said detector means, said train including a sub-train of two successive same projection data;

generating means for adding the projection data in said train and later transferred projection data in said train and for generating the estimated projection data including an interpolated one between said views; and image reconstruction means for forming a reconstructed image of the object from said estimated projection data.

According to the invention, there is further provided a method of reconstructing a cross-sectional image of an object comprising the steps of;

directing a fan-beam of radiation passing through said object;

measuring the radiation through said object by means of a plurality of detectors lying within a plane of said fan-beam and situated opposite to said radiation source;

causing relative motion between said source and said object within said plane in such a way that said detectors always remain opposite said source;

obtaining projection data from said detectors at different viewpoints with respect to said object;

partially transferring said projection data twice in accordance with said relative motion;

adding said projection data and the next transferred one for producing the estimated projection data including an interpolated one between said views; and reconstructing said estimated projection data into a cross-sectional image of said object.

BRIEF DESCRIPTION OF THE DRAWINGS

FIG. 3 is a block diagram of an X-ray CT apparatus according to an embodiment of the present invention;

FIG. 4 is a table for explaining the relationship between the timings of the data transfer sequence and of the processing sequence of the image reconstruction;

FIG. 9 is a table for explaining timings of the interpolation operation by the interpolator shown in FIG. 8.

DETAILED DESCRIPTION OF THE PREFERRED EMBODIMENT

A CT apparatus and a method of reconstructing a cross-sectional image according to the invention has fundamental characteristics in that an interpolating function is provided to perform interpolation using projection data transferred from a CPU (central processing unit) so as to obtain estimated interpolating data, and that the estimated interpolating data and the projection data are supplied to an image reconstructor one after another.

The fundamental principle of the present invention will be described hereinafter with reference to FIG. 3 when the invention is applied to an X-ray CT apparatus.

Figure 1:
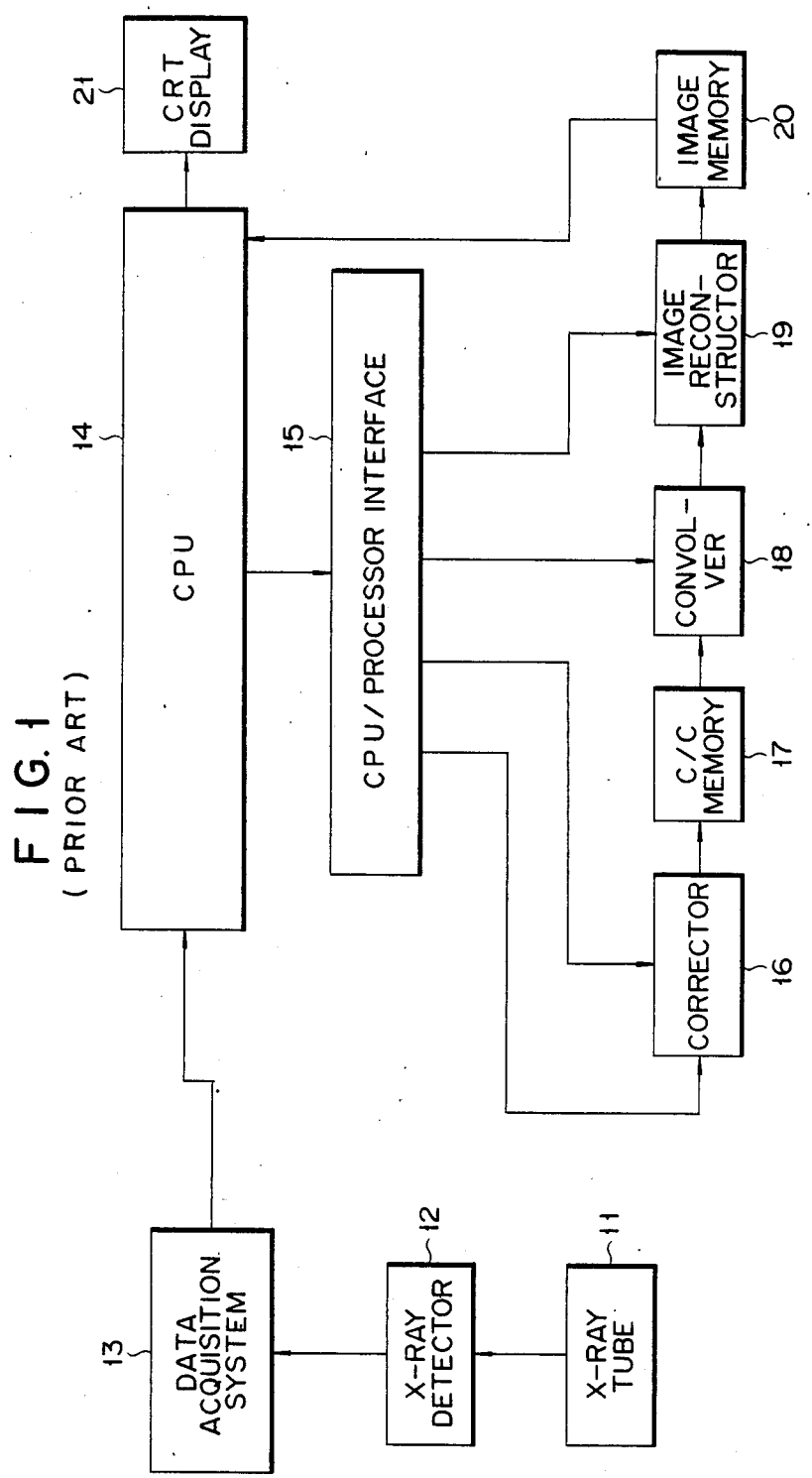
FIG. 1 is a block diagram showing an example of a conventional X-ray CT apparatus.
Figure 2:
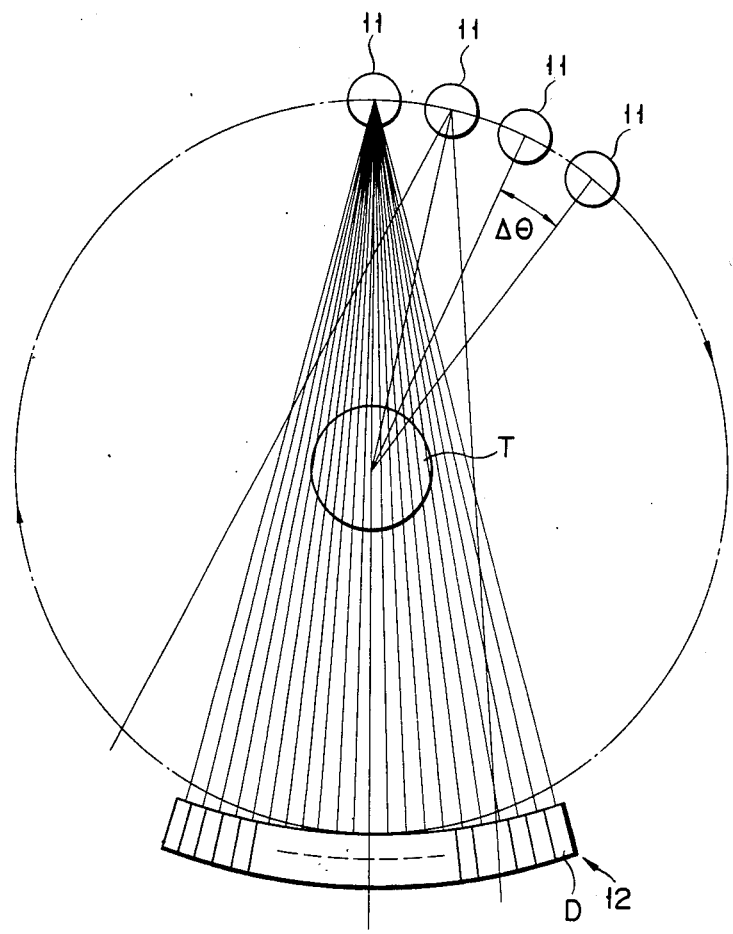
FIG. 2 is a view showing an X-ray tube and an X-ray detector which oppose each other and symmetrically with each other about a object.
Figure 5:
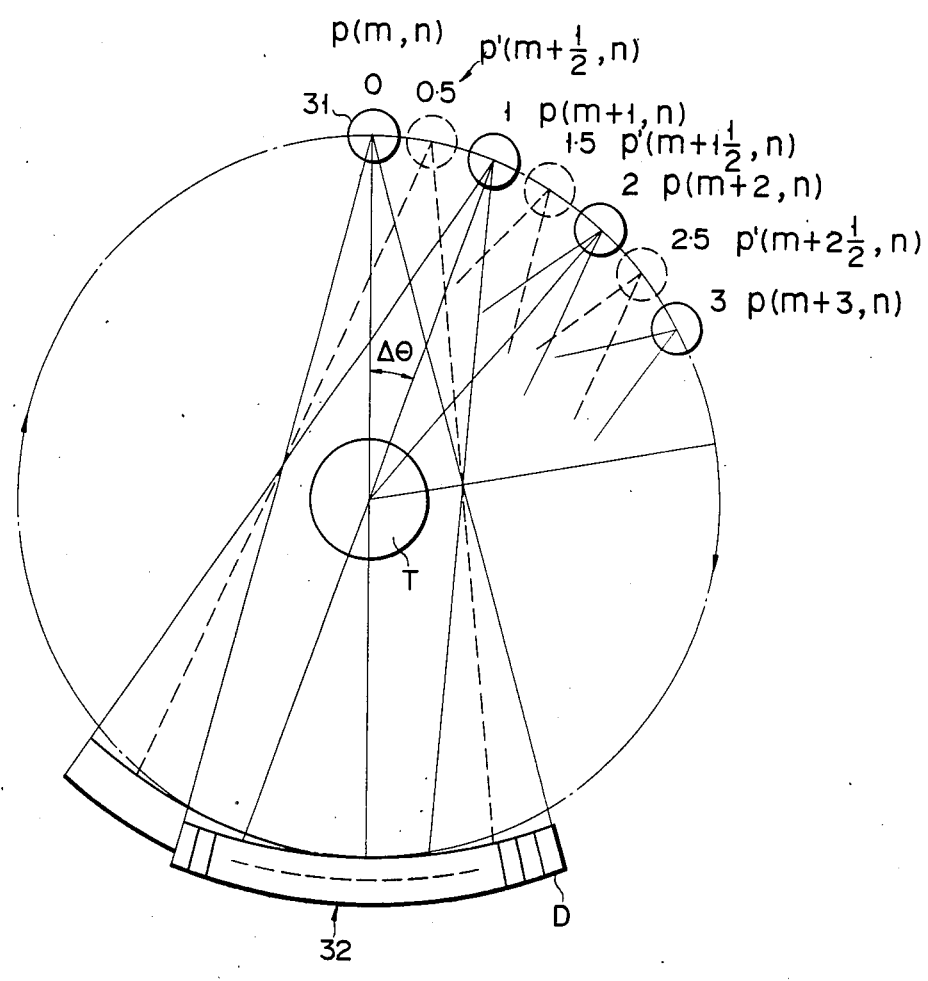
FIG. 5 is a view showing an X-ray tube and an X-ray detector which oppose each other and symmetrically with each other about an object, and especially estimated data of a position between the actual two projection positions.

A fan-beam of X-rays projected from an X-ray tube 31 and transmitted through an object T is detected by an X-ray detector 32 comprising a plurality of detecting elements D. The X-ray tube 31 and the X-ray detector 32 are substantially the same as those shown in FIG. 2. The X-ray tube 31 and the detector 32 are relatively rotated. Each detecting element D receives a X-ray in a path (channel) formed by connecting the X-ray tube 31 and the detecting element and provides an output signal representative of X-ray intensity integrated along the path. This detector 32 may be replaced by the stationary arc of fixed detectors. X-rays detected by the elements are acquired by the data acquisition system 33 in which the X-rays are converted to digital projection data. The projection data are then supplied to a CPU 34. The CPU 34 consecutively transfers each projection data, for example, twice, to an interpolator 35. At first transfer timing "0", the CPU 34 produces projection data "0" at point P(m, n), as shown in FIG. 5. The CPU 34 produces the projection data "0" at second transfer timing "1". At third transfer timing "2", the CPU 34 then transfers projection data "1" at point P(m+1, n) which is spaced apart by the angle $\Delta\theta$ from the point P(m, n). The CPU 34 also transfers projection data "1" at fourth transfer timing "3". The interpolator 35 interpolates the projection data which are sequentially transferred thereto. The interpolator 35 interpolates two adjacent projection data which are sequentially transferred from the CPU 34 to obtain estimated interpolating data "0.5" at point P'(m+½, n) shown in FIG. 5. Estimated interpolating data "1.5" at point P'(m+3/2, n) and estimated interpolating data "2.5" at P'(m+5/2, n) can be obtained in the same manner as described above. The estimated data and the actual projection data are supplied one after another to an image reconstructor 36. The image reconstructor 36 performs image reconstruction for each data supplied from the interpolator 35. Reconstructed image data obtained by the image reconstructor 36 are supplied to an image memory 37 and accumulated therein. Accumulated image data is then read out from the image memory 37 and is displayed at a CRT display 38.

Figure 6:
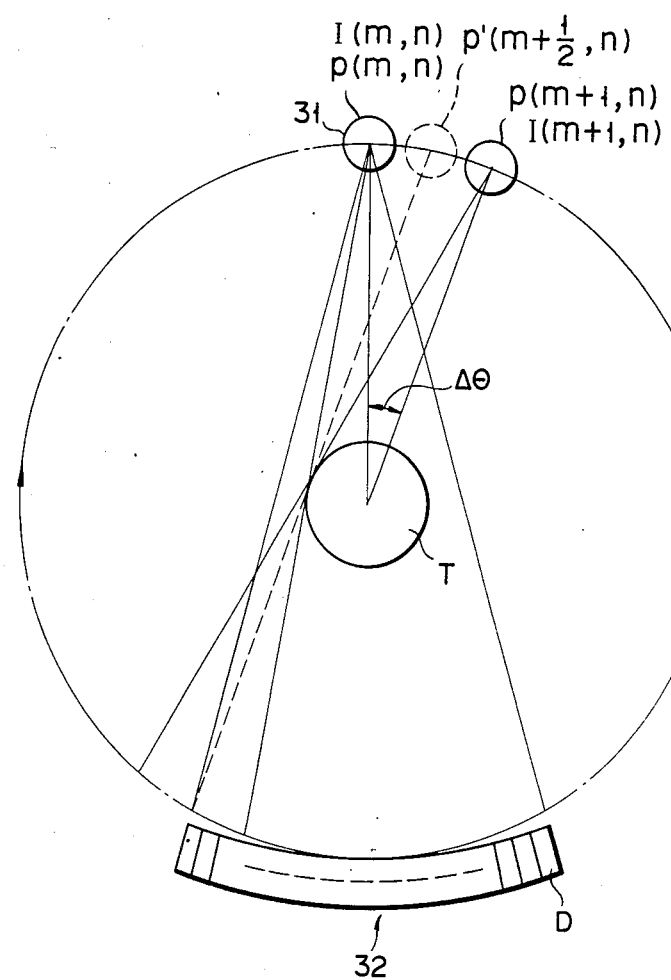
FIG. 6 is a view showing an X-ray tube and an X-ray detector which oppose each other and symmetrically with each other about a object in the same manner as in FIG. 5.

The fundamental principle of the present invention will be described in detail hereinafter. The projection data obtained by the first X-ray projection correspond to the number of channels (detector elements). In order to perform interpolation in accordance with two projection data obtained at the adjacent projection positions, for example, positions P(m, n) and P(m+1, n) (generally, two adjacent projection data are designated in the form of I(m, n) and I(m+1, n)) as shown in FIG. 6, interpolating operation is performed for every channel of projection data I(m, n) and I(m+1, n). Interpolated data for every channel is obtained at position P'(m+½, n) between two positions P(m, n) and P(m+1, n), where P'(m+½, n)=½{P(m+1, n)+P(m, n)}.

The following operation is performed by the interpolator 35:

$$I'(k, n) = \tfrac{1}{2}\{I(j, n) + I(j+1, n)\}$$

where I'(k, n) is interpolated data (for every channel) obtained by the projection data at two adjacent views of projections, I(j, n) and I(j+1, n) are projection data at two adjacent views of projections so as to obtain interpolated data I'(k, n).

When the CPU 34 transfers each projection data twice to the interpolator 35, interpolated data I'(k, n) can be obtained as follows:

$$I'(k, n) = P'(m+\tfrac{1}{2}, n) \qquad (1)$$

for I(j, n)=P(m+1, n) and I(j+1, n)=P(m, n)

$$I'(k, n) = P'(m, n) \qquad (2)$$

for I(j, n)=P(m, n) and I(j+1, n)=P(m, n)
where P'(m, n)=½{P(m, n)+P(m, n)}.

Specifically, when the CPU 34 transfers each projection data twice to the interpolator 35, the interpolator 35 interpolates two adjacent projection data to obtain interpolated data. The interpolated data and the projection data are supplied one after another to the image reconstructor 36. The image reconstructor 36 performs image reconstruction for each data supplied from the interpolator 35.

Figure 7:
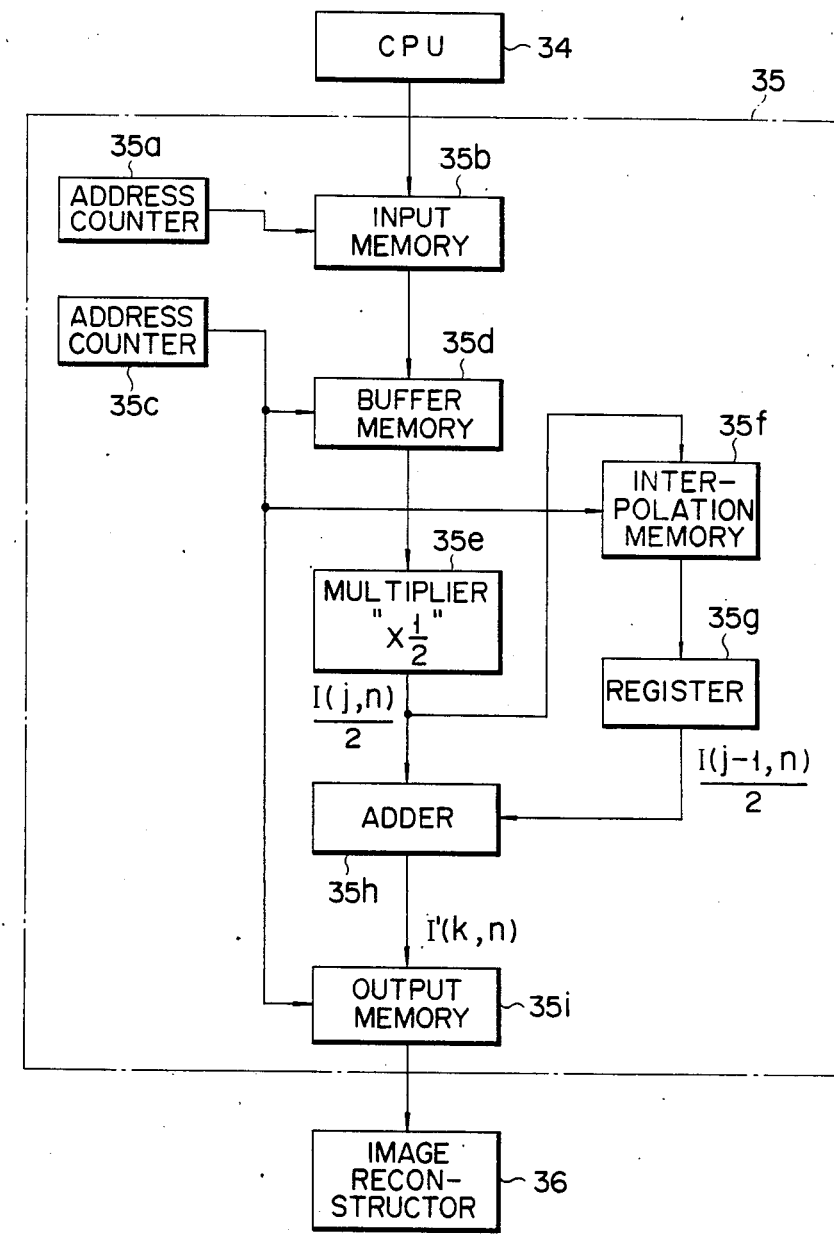
FIG. 7 is a block diagram showing an interpolator of the X-ray CT apparatus shown in FIG. 3.

The arrangement of the interpolator 35 and its interpolating operation will be described with reference to FIG. 7. FIG. 7 is a block diagram showing the arrangement of the interpolator 35 of the CT apparatus according to an embodiment of the present invention.

The interpolator 35 comprises: an input memory 35b for storing each projection data corresponding to one projection operation transferred from the CPU 34 in a memory area whose address is accessed by a first address counter 35a; a buffer memory 35d for reading out each projection data at a high speed and storing the projection data for each channel in a memory area whose address is accessed by a second address counter 35c; a multiplier 35e for multiplying the projection data read out from the buffer memory 35d for every channel beginning from 0th channel by $\frac{1}{2}$; an interpolation memory 35f for sequentially storing the multiplied data therein and for reading out the multiplied data stored in a memory area whose address is accessed by the second address counter 35c; a resistor 35g for temporarily storing the data read out from the interpolation memory 35f; an adder 35h for adding the multiplied data from the multiplier 35e and the data read out from the register 35g; an output memory 35i for storing the sum in a memory area whose address is accessed by the second address counter 35c and for reading out all the projection data and supplying them to the image reconstructor 36 at a high speed immediately after all the projection data at the first transfer timing are stored therein; and first and second address counters 35a and 35c for designating addresses of the memories 35b, 35d and 35f.

The mode of operation of the interpolator 35 shown in FIG. 7 will be described.

The CPU 34 transfers each projection data twice to the input memory 35b. In the input memory 35b, the projection data transferred from the CPU 34 at the first transfer timing are stored in a memory area whose addresses are designated by the first address counter 35a. After the input memory 35b stores the projection data for all channels which are transferred at the first transfer timing, the input memory 35b transfers the projection data to the buffer memory 35d at a high speed. The buffer memory 35d thus stores the projection data transferred from the input memory 35b. The address for storing the projection data for each channel in the input memory 35b and the address for storing the projection data for each channel in the buffer memory 35d are respectively accessed by the first and second address counters 35a and 35c. The projection data for every channel are read out from the buffer memory 35d beginning from the 0th channel, and the multiplier 35e multiplies the readout data by $\frac{1}{2}$. The multiplied result (multiplied data) is sequentially stored in a memory area of the interpolation memory 35f. The address of the memory area is accessed by the second address counter 35c. At the same time, the data in the interpolating memory 35f is sequentially read out and supplied to the adder 35h. The above operation can be performed for the projection data for all the channels at the first transfer timing. While the projection data are read out and multiplied and are supplied to the adder 35h, projection data for each channel at the second transfer timing are stored in the input memory 35b. It is noted that the multiplied projection data at the first transfer timing cannot be added by the adder 35h to another data since the data stored in the register 35g is invalid. Therefore, the multiplied projection data at the first transfer timing cannot be used for reconstruction of the image. After the multiplied projection data for all the channels at the first transfer timing are stored in the interpolation memory 35f, the projection data for all the channels at the second transfer timing are transferred from the input memory 35b to the buffer memory 35d. The projection data for each channel beginning from the 0th channel are read out from the buffer memory 35d and are respectively multiplied by $\frac{1}{2}$. The multiplied data are then supplied to the interpolation memory 35f and to the adder 35h. While the (k−1)th channel data among the projection data at the second transfer timing is multiplied by the multiplier 35e, the "k"th channel data among the projection data at the first transfer timing is transferred from the interpolation memory 35f to the register 35g. The "k"th multiplied channel data at the second transfer timing is properly stored in the interpolation memory 35f. Simultaneously as the multiplied result or product of the "k"th channel data among the projection data at the second transfer timing is supplied from the multiplier 35e to the adder 35h, the multiplied result of the "k"th channel data among the projection data at the first transfer timing is supplied from the register 35g to the adder 35h. The multiplied result of the "k"th channel data at the second transfer timing is added to the multiplied result of the "k"th channel data at the first transfer timing. The sum thus obtained is stored as interpolated data in the output memory 35i. Interpolated data for each channel is obtained in this manner and is sequentially stored in the output memory 35i.

The above operation is repeated for all the projection data transferred from the CPU 34 at the subsequent timings so as to obtain the reconstructed image. The CPU 34 and the interpolator 35 produce the estimated data, like a pipeline, and achieve the fast generation of estimated data. As a result, the image reconstructor 36 produces a fast reconstructed image. The word "estimated data" means both an actual projection data and an interpolated data. It is also valuable in the fourth generation CT apparatus comprising the stationary arc of fixed detectors to interpolate projection data by the interpolator of the invention.

Figure 8:
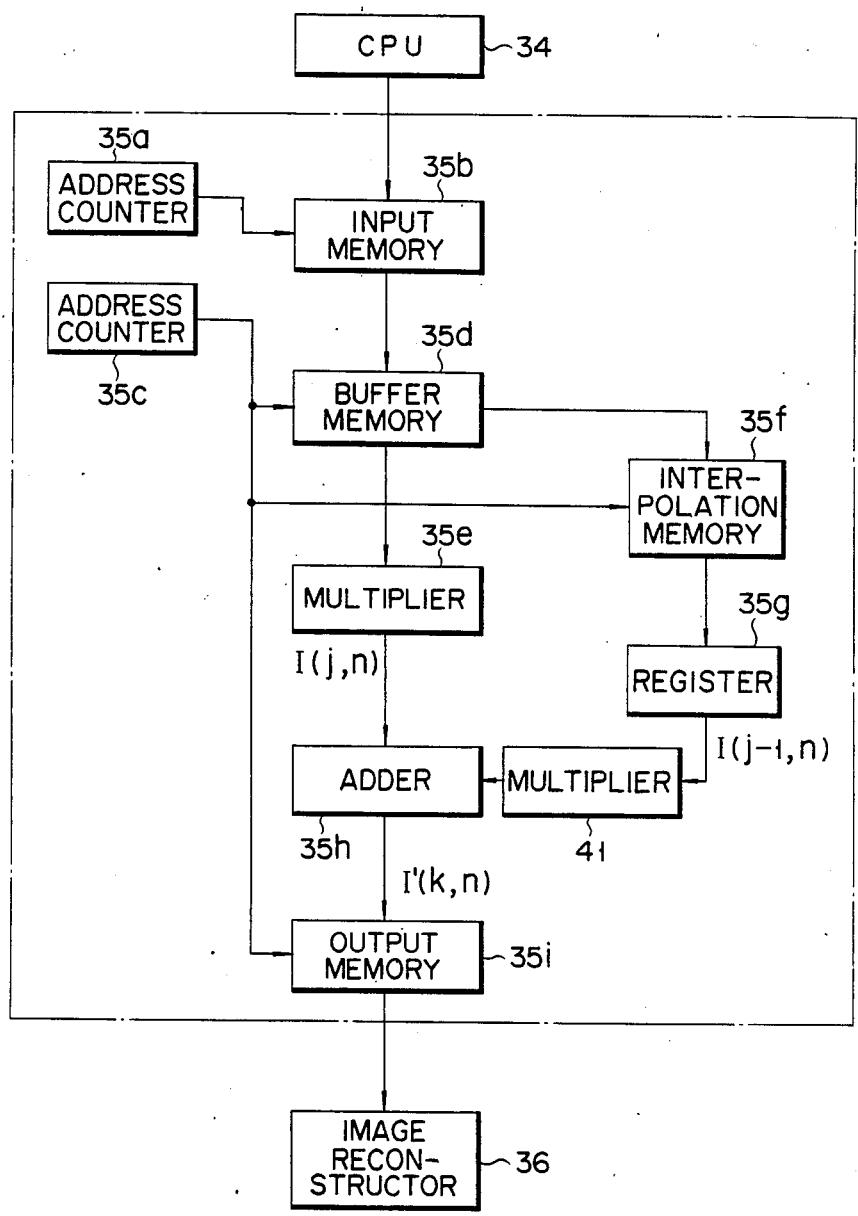
FIG. 8 is a block diagram showing an interpolator according to another embodiment of the present invention.

In the above embodiment, interpolated data of an intermediate position between the two adjacent positions is obtained. However, the present invention is not limited to the above mode of operation. For example, the present invention may be applied to a case in which estimated data at 400 imaginary positions defined in accordance with a given rule are obtained when 300 projection positions are actually obtained. FIG. 8 shows an interpolator for performing such interpolation of a CT apparatus according to another embodiment of the present invention. The circuit arrangement shown in FIG. 8 is substantially the same as that shown in FIG. 7, except that the CPU 34 transfers data at a timing different from that used in the arrangement in FIG. 7, data from the buffer memory 35d is directly transferred to the interpolation memory 35f without going through the multiplier 35e, and a multiplier 41 is arranged between the register 35g and the output memory 35h. The same reference numerals used in FIG. 7 denote the same parts in FIG. 8, and a detailed description thereof will be omitted. The multipliers 35e and 41 are controlled to change the multiplicators in accordance with the transfer sequence.

In this embodiment, the transfer sequence of the projection data from the CPU 34 is shown in the table of FIG. 9. The projection data at the first transfer timing is consecutively transferred twice. The projection data at the second and third transfer timings are respectively transferred once. The projection data at the fourth transfer timing is transferred twice; and the pieces of projection data at the fifth and sixth transfer timings are respectively transferred once. The above operation is repeated: generally, the "i"th projection data is transferred twice, and the (i+1)th projection data and the (i+2) projection data are respectively transferred once, where "i" is a natural number. Specifically, the projection data at the first transfer timing are stored in a memory area of the input memory 35b, whose address is accessed by the first address counter 35a. After the projection data for all the channels at the first transfer timing are stored in the input memory 35b, the projection data are transferred to the buffer memory 35d at high speed and are stored in a memory area whose address is accessed by the address counter 35c. The projection data which are stored in the first buffer memory 35d are sequentially read out for each channel beginning from the 0th channel. The projection data for each channel is then supplied to the multiplier 35e and are multiplied by $\frac{1}{4}$. At the same time, the projection data for each channel is transferred and stored in the interpolation memory 35f. The multiplication result or product is supplied to the adder 35h and is added to the multiplication result from the multiplier 41. The sum is then supplied to the output memory 35i. When the multiplied projection data at the first transfer timing are added, the product of the second multiplier 41 is invalid. Thus, the multiplied projection data are not used for image reconstruction. Thereafter, the projection data at the second transfer timing (the same as the projection data at the first transfer timing) from the CPU 34 are transferred to the input memory 35b and stored therein. After the projection data for all the channels at the second transfer timing are stored, they are transferred to the first buffer memory 35d at a high speed. Before the storage of the data at the second transfer timing, all the projection data for all the channels at the first transfer timing have been transferred to the interpolation memory 35f. The projection data at the second transfer timing are sequentially read out for each channel beginning from the "0"th channel in the same manner as in the projection data at the first transfer timing and are stored in the interpolation memory 35f. At the same time, they are supplied to the multiplier 35e and are respectively multiplied by one. It is noted that the "k"th channel projection data at the first transfer timing is transferred to the register 35g before the "k"th channel projection data at the second transfer timing is stored in the interpolation memory 35f. Simultaneously as the multiplied result of the "k"th channel projection data at the second transfer timing is supplied to the adder 35h, the multiplied result obtained by multiplying the "k"th channel projection data at the first transfer timing is supplied from the multiplier 41 to the adder 35h. Therefore, the multiplied result of the "k"th channel projection data at the second transfer timing and the multiplied result of the "k"th channel projection data at the first transfer timing are added by the adder 35h. This sum is stored in an output memory 35i. The sum data for each channel is sequentially stored in the output memory 35i. The data stored in the output memory 35i is read out therefrom and is supplied to the image reconstructor 36.

In this embodiment, the multipliers of the first and second multipliers 35e and 41 are determined to be different values in accordance with the corresponding transfer sequences. The multipliers at the first, second, third and fourth transfer timings are respectively set in the first multiplier 35e to be $\frac{1}{4}$, $\frac{1}{4}$, $\frac{3}{4}$ and 2/4. The multipliers at the first, second, third and fourth transfer timings are respectively set in the second multiplier 41 to be $\frac{1}{4}$, $\frac{1}{4}$, 2/4 and $\frac{3}{4}$.

In this embodiment, 400 pieces of estimated data are generated from 300 pieces of actual projection data. The precision of the reconstruction image can be improved in the same manner as in the first embodiment.

The present invention is not limited to the above particular embodiments. It should be understood that various changes and modifications may be made within the spirit and scope of the present invention. In the first embodiment, any feature and arrangement of interpolation may be utilized only if each projection data is stored and is interpolated with the immediately following projection data. For example, the projection data may be transferred from the CPU 34 to the input memory 35b once and the each data may be read out twice and is supplied to the multiplier 35e through the buffer memory 35d, instead of transferring each projection data twice. In this case, the interpolation speed can be further increased.

As may be apparent from the above description, since each projection data is transferred from the CPU to the interpolator for a predetermined number of times for predetermined interpolation, the circuit arrangement can be simplified, thus simplifying monitoring of the software. Since a large-capacity memory for storing all the projection data for one picture is not required, the structure of the apparatus may also be simplified. Further, since data retrieval and writing involving a large-capacity memory need not be performed, the processing speed can thus be increased. Further, since the CPU and the interpolator produce the estimated data, like a pipeline, the image can be reconstructed at a high speed.

What is claimed is:

1. A computerized tomography apparatus for reconstructing a cross-sectional image of an object comprising
    source means for directing fan-shaped beams of radiation to pass through the object;
    detector means having a plurality of elements for detecting the radiation through the object along a plurality of paths of said fan-shaped beams and for providing measured projection data representative of radiation intensity integrated along each of said paths;
    scanning means for rotating at least said source about the object to cause said fan-shaped beams to assume successive different angularly spaced viewpoints m relative to the object
    estimating means for generating estimated projection data for imaginary viewpoints between said viewpoints m, said estimating means including;
    transfer means for transferring a train of said projection data obtained from said detector means at said viewpoints m, said train periodically including two successive identical projection data therein, and
    adding means for successively adding the last two projection data transferred from said transfer means to generate a stream of said measured projection data with said estimated projection data interspersed at positions among said measured projection data corresponding to positions of said imaginary viewpoints among said viewpoints m; and
    image reconstruction means for performing convolutions and back projections of the estimated projection data provided from said estimating means to reconstruct the cross-sectional image of the object.

2. The apparatus according to claim 1, wherein said transfer means successively transfers twice the identical projection data from said detector means to said adding means, so that said estimating means generates estimated projection data which is two times as much as the number of projection data from said detector means.

3. The apparatus according to claim 1, wherein said transfer means successively transfers twice the identical projection data from said detector means every third projection data to said adding means, so that said estimating means generates estimated projection data which is about 3/2 times as much as the number of projection data from said detector means.

4. The apparatus according to claim 3, wherein said adding means adds the projection data with first weighting values and the last projection data with second weighting values, the first weighting values comprising a train of $\frac{1}{2}$, $\frac{3}{4}$, $\frac{1}{2}$ and $\frac{1}{4}$, the second weighting values comprising a train of $\frac{1}{2}$, $\frac{1}{4}$, $\frac{1}{2}$ and $\frac{3}{4}$.

5. A computerized tomography apparatus for reconstructing a cross sectional image of an object comprising:
   source means for directing fan shaped beams of radiation to pass through the object;
   detector means having a plurality of elements for detecting the radiation through the object along a plurality of paths of said fan shaped beams and for providing corresponding output signals representative of radiation intensity integrated along each of said paths;
   scanning means for effecting relative rotation of said source means with respect to said object and for obtaining successively projection data from said output signals at successive angularly spaced viewpoints m with respect to said object;
   interpolating means for generating estimated projection data for viewpoints between said viewpoints m, said estimated projection data being generated from two received projection data at different viewpoints; and
   image reconstruction means for forming a reconstructed image of the object from estimated projection data to reconstruct the cross sectional image of the object;
   said interpolating means further including transfer means receiving the projection data from said scanning means and transferring successively at each step N the projection data corresponding to a viewpoint m such that at least some of the projection data is sequentially transferred twice, and generating means comprising memory means for storing the projection data transferred from said transfer means at step N−1, multiplying means for multiplying the projection data received at the memory means at step N−1 and the projection data transferred from said transfer means at a step N by respective first and second weighting values, and adding means for adding the multiplied values from said multiplying means to provide said estimated data at viewpoints between said spaced viewpoint m to said image reconstruction means.

6. The apparatus according to claim 5, wherein said transfer means successively transfers twice each projection data from said scanning means to said generating means and said first and second weighting values are $\frac{1}{2}$, so that said generating means generates estimated projection data which is two times as much as the number of projection data from said detector means.

7. An apparatus accoding to claim 6, wherein said generating means further comprises:

an input memory for storing each of the projection data transferred from said transfer means;
a buffer memory for storing each of the profection data means read out from said input memory at high speed;
said multiplying means for multiplying each of the projection data stored in said buffer memory by $\frac{1}{2}$;
said memory means for storing a multiplied result; and
said adding means for adding the multiplied result stored in said memory device and corresponding to each of the projection data at step N−1 and a multiplied result corresponding to the projection data obtained at step N by said multiplying means.

8. The apparatus according to claim 5, wherein said transfer means successively transfers twice only every third projection data from said scanning means to said generating means and the first weighting values comprise a train of $\frac{1}{2}$, $\frac{1}{4}$, $\frac{1}{2}$ and $\frac{3}{4}$, the second weighting values comprise a train of $\frac{1}{2}$, $\frac{3}{4}$, $\frac{1}{2}$ and $\frac{1}{4}$, with the first value $\frac{1}{2}$ of the first train being thus multiplied with the first one of the projection data transferred twice and with the first value $\frac{1}{2}$ of the second train being thus multiplied with the second one of the projection data transferred twice, so that said generating means generates estimated projection data which is about 3/2 times as much as the number of projection data from said detector means.

9. The apparatus according to claim 5 wherein said generating means further comprises:
   an input memory for storing each of the projection data transferred from said transfer means;
   a first buffer memory for reading out and storing each of the projection data read out from said input memory;
   a first multiplier for multiplying each of the projection data read out at step N from said first buffer memory by a predetermined factor;
   said memory means for storing the projection data read out at step N−1 from said first buffer memory;
   a second multiplier for multiplying the projection data read out from said memory device by a predetermined factor; and
   said adding means for adding multiplied results obtained by said first and second multipliers.

10. A computerized tomography apparatus for reconstructing a cross sectional image of an object comprising:
    source means for directing fan shaped beams of radiation to pass through the object;
    detector means having a plurality of elements for detecting the radiation through the object along a plurality of paths of said fan shaped beams and for providing corresponding output signals representative of radiation intensity integrated along each of said paths;
    scanning means for effecting relative rotation between said source means and said detector means and for obtaining projection data from said output signals at different viewpoints with respect to said object;
    transfer means receiving the projection data from said scanning means and transferring projection data indicated by a maximum integer which does not exceed C×N at transfer sequence N, where C is a constant larger than 0 and less than 1, and N is a successive integer;

generating means comprising a memory device for storing the projection data transferred from said transfer means at transfer sequence N−1, multiplying means for multiplying the projection data transferred from said transfer means at transfer sequence N−1 and the projection data transferred from said transfer means at transfer sequence N by respective weighting values, and adding means for adding the projection data transferred from said transfer means at transfer sequence N−1 and N and multiplied by said respective weighting values to provide estimated data at C×(N−1) viewpoint; and image reconstruction means for forming a reconstructed image of the object from said estimated projection data to reconstruct the cross sectional image of the object.

11. The apparatus according to claim 10, wherein said C is 0.5 and said weighting values are ½.

12. The apparatus according to claim 10, wherein said C is 0.75 and said weighting values comprises first and second sets to be circulated, said first set being ½, ¾, ½ and ¼ and said second set being ½, ¼, ½ and ¾, and the summation of respective weighting values of said first and second sets being 1.

13. The apparatus according to claim 12, wherein the projection data transferred from said transfer means at transfer sequence N is multiplied by ½ when said viewpoint C×(N−1) is a multiple of 0.5, and the projection data transferred from said transfer means at transfer sequence N is a decimal fraction of said viewpoint C×(N−1), when said viewpoint C×(N−1) is that other than a multiple of 0.5.

* * * * *